United States Patent

Hummel

(10) Patent No.: US 10,753,429 B2
(45) Date of Patent: Aug. 25, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

(*) Notice: Subject to any disclaimer, the term of this patent is extended or adjusted under 35 U.S.C. 154(b) by 480 days.

(21) Appl. No.: 15/551,968

(22) PCT Filed: Jan. 21, 2016

(86) PCT No.: PCT/EP2016/000103
§ 371 (c)(1),
(2) Date: Aug. 18, 2017

(87) PCT Pub. No.: WO2016/131522
PCT Pub. Date: Aug. 25, 2016

(65) Prior Publication Data
US 2018/0038453 A1   Feb. 8, 2018

(30) Foreign Application Priority Data

Feb. 19, 2015   (DE) .................. 10 2015 002 134

(51) Int. Cl.
*F16H 3/00* (2006.01)
*F16H 3/089* (2006.01)
*F16H 3/08* (2006.01)

(52) U.S. Cl.
CPC ............. *F16H 3/006* (2013.01); *F16H 3/089* (2013.01); *F16H 2003/0803* (2013.01);
(Continued)

(58) Field of Classification Search
CPC . F16H 3/093; F16H 3/006; F16H 3/10; F16H 37/043; F16H 2003/007
(Continued)

(56) References Cited

U.S. PATENT DOCUMENTS

| 7,421,919 B2* | 9/2008 | Gumpoltsberger ..... F16H 3/006 74/330 |
| 7,472,617 B2* | 1/2009 | Nicklass ................. F16H 3/006 74/331 |

(Continued)

FOREIGN PATENT DOCUMENTS

| DE | 102011089167 A1 | 6/2013 |
| DE | 102012013248 A1 | 1/2014 |

(Continued)

OTHER PUBLICATIONS

Notification of Transmittal of Translation of the International Preliminary Report on Patentability dated Aug. 24, 2017, in connection with corresponding international application No. PCT/EP2016/000103 (19 pages).

(Continued)

*Primary Examiner* — Ha Dinh Ho
(74) *Attorney, Agent, or Firm* — Maier & Maier, PLLC

(57) ABSTRACT

A dual clutch transmission for a motor vehicle, with switchable gearwheel sets which form in particular exactly eight wheel planes (RE-1 through RE-8), which are assigned to a first and to a second sub-transmission. The sub-transmissions are provided with at least one input shaft and with a common output shaft and the input shafts can be alternately activated via a load-switchable clutch. Furthermore, the odd forward gears are assigned to the sub-transmission and even forward gears are assigned to the other sub-transmission, which are switchable by corresponding switching elements. At least one gearwheel set of one sub-transmission can be coupled with a switching element to the other sub-transmission.

17 Claims, 2 Drawing Sheets

(52) U.S. Cl.
CPC ............... *F16H 2003/0818* (2013.01); *F16H 2003/0822* (2013.01); *F16H 2003/0826* (2013.01); *F16H 2200/0078* (2013.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 7,886,626 B2* | 2/2011 | Bjorck | F16H 3/006 74/330 |
| 8,117,932 B2* | 2/2012 | Bjorck | F16H 3/006 74/329 |
| 8,438,941 B2* | 5/2013 | Mellet | F16H 3/006 74/330 |
| 2004/0093972 A1* | 5/2004 | Gumpoltsberger | F16H 3/006 74/325 |

FOREIGN PATENT DOCUMENTS

| | | |
|---|---|---|
| DE | 102012217008 A1 | 4/2014 |
| DE | 102012219437 A1 | 4/2014 |
| WO | 2016/023792 A1 | 2/2016 |

OTHER PUBLICATIONS

Office Action dated Aug. 27, 2019, in corresponding Chinese Application No. 201680011335.0 including partial machine-generated English language translation; 7 pages.

International Search Report dated May 4, 2016 of corresponding International application No. PCT/EP2016/000103; 29 pgs.

International Preliminary Report on Patentability dated May 31, 2017 of corresponding International application No. PCT/EP2016/000103; 24 pgs.

* cited by examiner

Fig. 2

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|---|---|---|---|---|---|---|---|---|---|---|---|---|---|---|---|
| 1 | x | | | | | | x | | x | x | ro | iii | | | | |
| 1 | | x | x | x | | | x | | | | | | iii | ro | | |
| 2 | | x | x | x | | | | | | | | | iii | | | ro |
| 3 | x | x | | | x | | | | | | | | | | | |
| 3 | | x | | | x | | x | | | | | | | | | |
| 4 | | x | | | | | | | | | iii | | ro | | | |
| 5 | x | x | x | | | | | | | | ro | | ro | | | |
| 6 | x | x | | | | | | | | x | | iii | | iii | | iii | |
| 7 | x | | | | | | | | | | iii | | ro | | iii | |
| 8 | x | x | | x | | | | | x | x | x | ro | ro | | | iii | iii |
| 9 | x | x | x | x | | | | | x | x | x | | ro | iii | iii | | |
| 10 | x | x | x | x | | x | | | | | | iii | | iii | iii | | |
| 11 | x | | | | | x | | | | | | iii | | ro | | | |
| 12 | | x | | | | | | | | | | | | ro | iii | | | ered with the multiple use with a
DUAL CLUTCH TRANSMISSION FOR A MOTOR VEHICLE

FIELD

The present invention relates to a dual clutch transmission for a motor vehicle according to the preamble of the patent claim.

BACKGROUND

Such dual clutch transmissions have been often used in motor vehicles. In addition to a good efficiency and other advantages, they also have the advantage that they are automatically switchable without an interruption of the tractive force, wherein a gear stage can be preselected already in a respective non-activated sub-transmission, which is then activated by the selection of the load-shiftable clutches. In this case, the odd gears (1, 3, 5, etc.) are positioned in one sub-transmission, and in another sub-transmission are positioned the even gears (2, 4, 6, etc.) by means of corresponding gearwheel sets, which are for example drivingly connected via synchronous clutches to the respective input shafts or output shafts.

SUMMARY OF THE DISCLOSURE

The object of the invention is to provide a dual clutch transmission which provides with a structurally advantageous construction a greater degree of freedom and functionality (shifting strategy) and which has an advantageous design of the gear stages.

According to the invention it is proposed that at least one gearwheel of the at least one sub-transmission can be coupled via a switching element to another sub-transmission. The basic idea of the invention is to be able to skip at least one forward gear with a small technical expense required for the transmission and without giving up the advantage of the tractive force with uninterrupted acceleration of the motor vehicle, which is to say to be able to shift for example from an odd forward gear without a delay to the next odd forward gear. In particular with a strong mechanization of the motor vehicle and with defined driving conditions, this can enable improved acceleration occurring without switching delays.

It is particularly preferred when the gearwheel set forms the at least 3rd forward gear of the sub-transmission, which can be drivingly connected, directly or indirectly, to the input shaft of one of the partial transmissions A, B. The result is that in addition to the regular switching strategy, it is possible to switch from the 1st gear to the 3rd gear and when required also from this gear to the 5th gear without an interruption in the tractive force.

If in the case of a corresponding technical design of the transmission, said gearwheel set is also incorporated in the power flow of the 1st forward gear, the sub-transmission can be switched also here, wherein additional degree of freedom in functionality can be obtained.

In a preferred embodiment of the invention, the output-side fixed gearwheel, which can be switched on both sub-transmissions, can be arranged on the common output shaft of the output shaft of the dual clutch transmission, while the corresponding switchable drive-side gearwheel can be coupled in a technically simple manner to the transmission element of the sub-transmission A or of the sub-transmission B. The shifting clutch or the switching element can be in this case a dual clutch by means of which a gearwheel of a sub-transmission or the gearwheel of the other sub-transmission is switchable.

In a preferred further development of the invention, only eight gear levels can be used with the multiple use with a 12-speed gearbox, wherein the commonly used gearwheel sets of one sub-transmission are arranged directly adjacent to the other sub-transmission. The construction of the shifting clutch can thus be relatively small and it can be provided with a very small number of switching elements and gear adjusting stages.

In addition, the fixed gearwheels can be attached to both sub-transmissions on respective common hollow shafts, which can be rotatably mounted on a common drive shaft as well as coupled via shifting clutches to the output shaft.

Furthermore, further drive-side gearwheels of the gear planes can be arranged on a hollow shaft, which is mounted on the input shaft of one of the sub-transmissions and which can be coupled by means of a shifting clutch to said gearwheel set of the other sub-transmission.

Finally, the twelve forward gears can be switched with as small expense in gear technology as possible by means of five dual clutches and a simple clutch, wherein four dual clutches are positioned coaxially arranged on both input shafts of the sub-transmission and a simple clutch is arranged on the common output shaft.

It is particularly preferred when the input shaft can be kept completely free of rotationally fixed gearwheels arranged thereupon of the wheel planes RE-1 through RE-8. In this case, each of the input shafts is provided with exactly one switching element SE-A, which is in particular switchable on both sides in the axial direction, and with SE-C. By means of the first switching element SE-C, the first input shaft can be coupled to or decoupled from all of the wheel planes RE-1 through RE-4 of the first sub-transmission A. By means of the second switching element SE-A, the second input shaft can be coupled to or decoupled from all of the wheel planes RE-5 through RE-8 of the second sub-transmission B.

Therefore, according to the invention, both coaxial input shafts no longer carry fixed wheels, but only the first and the second switching elements. As a result, the input shafts can be designed with a significantly reduced material amount in comparison to the prior art mentioned above. In addition, by means of the first and second switching elements SE-C and SE-A, the wheel levels in the respective activated sub-transmissions can be at least partially decoupled from the torque flow (which is to say deactivated), whereby the inertial torque can be reduced. This results in a shortened switching time period or in a reduction of the energy required for the switching process.

The first switching element SE-C arranged in the first sub-transmission can be in a technical implementation switchable on both sides in the axial direction. In this case, the first switching element SE-C of the first sub-transmission A can be coupled to a loose gearwheel, which is mounted on the drive side the first input shaft, of a first wheel plane RE-1, or to a coaxially mounted hollow shaft of the first input shaft. The drive-side hollow shaft, which is rotatably mounted on the first input shaft, can preferably carry two drive-side fixed wheels, which are respectively assigned to a second wheel plane RE-2 and to a third wheel plane RE-3.

In a technical implementation, a drive-side gearwheel of a fourth wheel plane RE-4 can be loosely mounted on the hollow shaft of the first sub-transmission A. It can be provided with a third switching element SE-D for a driving connection with the hollow shaft, by means of which the loosely mounted drive-side of the fourth wheel plane RE-4 can be coupled to the drive side hollow shaft of the first sub-transmission A.

In a further development of the invention, a fifth wheel plane RE-45 is assigned to the second sub-transmission B which is directly adjacent to the first sub-transmission A in the axial direction. The fifth wheel plane RE-5 can be provided with a drive-side gearwheel, which is mounted on the second input shaft and preferably can be coupled by means of the above-mentioned third switching element SE-D to the drive-side hollow shaft of the first sub-transmission A. In this manner, the fifth wheel plane RE-5 can be switched to both sub-transmissions A, B.

The second switching element SE-A, supported by the second input shaft, can be switchable in the axial direction on both sides (for example as a dual synchronizing clutch). In this case, a drive-side loose gearwheel of the eight wheel plane RE-8 can be arranged in the axial direction on both sides of the second switching element SE-A in the second sub-transmission B mounted in the second input shaft, and a drive-side hollow shaft can be arranged coaxially mounted in the second input shaft. The drive-side hollow shaft and the above-mentioned loose gearwheel of the eight wheel plane can be alternately coupled to the second input shaft. The drive-side hollow shaft of the second sub-transmission B can preferably support a drive-side fixed gearwheel of the sixth wheel plane RE-6. For switching the drive-side loose gearwheel of the sixth wheel plane RE-6, the hollow shaft can be provided with a fourth switching element SE-B, by means of which the drive-side gearwheel, loosely mounted in the second sub-transmission of the sixth wheel plane, can be coupled to the drive-side hollow shaft. In a preferred embodiment, the drive-side loosely mounted gearwheel of the fifth wheel plane RE-5, which is switchable on both sides, can be also coupled by means of the above-mentioned fourth switching element SE-B to the drive-side hollow shaft of the sub-transmission B.

In a technical implementation, the output shaft is arranged axially parallel to the input shaft. It is preferred when the output-side gearwheels of the first and second wheel plane RE-1, RE-2 can be arranged non-rotatably in the first sub-transmission A on an output-side hollow shaft which is rotatably mounted coaxially on the output shaft. The output shaft can in addition be provided with a fifth switching element SE-F, by means of can be alternately coupled in the first sub-transmission the output-side hollow shaft or an output-side gearwheel of the third wheel plane RE-3 to the output shaft.

In a similar manner as in the first embodiment variant, the output-side gearwheels of the seventh and eighth wheel plane RE-7, RE-8 can be arranged also in the second sub-transmission non-rotatably on the output-side hollow shaft which is coaxially mounted rotationally on the output shaft. The hollow shaft, which is rotatably mounted in the second sub-transmission B on the output shaft, can be coupled by means of a sixth, one-sided switching element SE-E to the output shaft.

In an embodiment variant, the output-side gearwheel of the fifth wheel plane RE-5, which can be switched to both sub-transmissions A, B, is arranged as a fixed gearwheel on the output shaft. In this case, the fifth wheel RE-5 would be constantly rotating during the driving operation and this could potentially wear out the bearing prematurely. Against this background, the output-side gearwheel of the fifth wheel plane RE-5 can be also loosely mounted on the output shaft and it can be coupled via a seventh switching element SE-G to the output shaft.

BRIEF DESCRIPTION OF THE DRAWING

An embodiment of the invention will be next described in more detail with reference to the attached figures. The figures show the following:

FIG. 2 is a switching matrix of the speed-change gearbox according to FIG. 1.

DETAILED DESCRIPTION OF THE DRAWING

Figure 1:
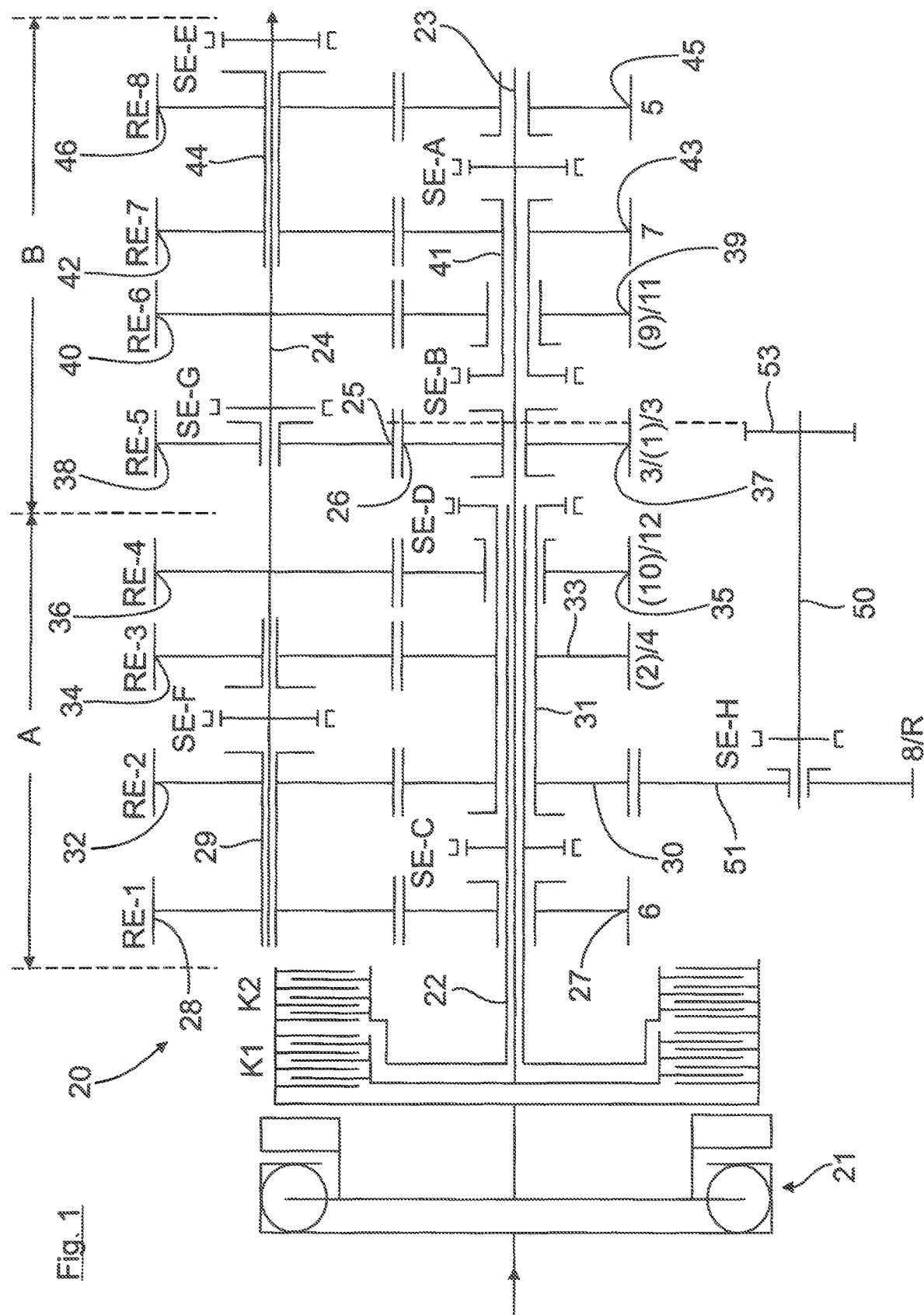
FIG. 1 is a block circuit diagram of a speed-change gearbox for motor vehicles with two sub-transmissions, which can be activated via two load-shiftable clutches and which can be used with 12 switchable forward gears, wherein a gearwheel set of the transmission can be used for both sub-transmissions.

FIG. 1 shows a speed-change gearbox or a dual clutch transmission 20 for a mother vehicle by means of which up to twelve forward gears 1 through 12 can be shifted to eight wheel planes by means of gearwheel sets RE-1 through RE-8. Each of the wheel planes RE-1 through RE-8 is constructed from a drive-side gearwheel which is coaxial to an input shaft 22, 23, and an output side which is coaxial to an output shaft 24.

The speed-change gearbox 20 is provided with two input shafts 22, 23 which can be connected to a torsional vibration damper 21 that is drivingly connected for example to an internal combustion engine (not shown), and which can be alternately coupled via two load-shiftable clutches K1, K2 to input shafts 22, 23, among which the input shaft 22 is a hollow shaft through which passes the second input shaft 23. The rotary bearings and the corresponding housing are not illustrated here.

The gearwheel sets or the wheel planes RE-1 through RE-8 are arranged in a known manner by means of switchable loose gearwheels and fixed wheels on the input shafts 22, 23 and on a common output shaft 24 in a manner that will be explained later, wherein the gearwheels RE-1 through RE4 form a first sub-transmission A and the gearwheels RE-5 through RE-8 form a second sub-transmission B.

The gearwheel RE-5 of the sub-division B is arranged with a first gearwheel 38 on the drive output shaft 24 and a switchable loose gearwheel 26 is arranged on the input shaft, axially immediately adjacent to the sub-transmission A in such a way that its loose gearwheel 27 can be coupled via a shifting clutch SE-D either to the sub-transmission A, or via a shifting clutch SE-B to the sub-transmission B.

The arrangement of the remaining gear sets is such that 12 forward gears can be realized with only eight gearwheel sets RE-1 through RE-8, wherein:

the loose gearwheel 27 of RE-1 on the input shaft 22 and its fixed gearwheel 28 is arranged non-rotatably on a hollow shaft 29 coaxially to the output drive 24;

a fixed gearwheel 30 of RE-2 is mounted via a hollow shaft 31 on the input shaft and the corresponding fixed gearwheel 32 is also arranged non-rotationally on the hollow shaft 29;

the loose gearwheel 27 and the hollow shaft 31 can be alternately coupled by means of a shifting clutch to the input shaft 22;

a fixed gearwheel 33 of RE-3 is arranged on the hollow shaft 31, while its loose gearwheel 34 or the hollow shaft 29 can be alternately coupled via a shifting clutch SE-F to the output shaft 24;

on the hollow shaft 31 is further mounted a loose gearwheel 35 of the gearwheel set RE-4 which meshes with the fixed gearwheel 36 on the output shaft 24;

immediately axially adjacent to the loose gearwheel 35 of the gearwheel set RE-4 is mounted the loose gearwheel 37 of the gearwheel set RE-5 on the central input shaft 23 of the sub-transmission B, which is in engagement with the other fixed gearwheel 38 on the output shaft 24;

both loose gearwheels 35, 37 can be alternately coupled via another shifting clutch SE-D to the hollow shaft 31 on the input shaft 22;

in addition, the loose gearwheel 37 can be coupled via a second shifting clutch SE-B to a hollow shaft 41 which is mounted on the input shaft 23, wherein the hollow shaft 41 supports a loose gearwheel 39 of the gearwheel set RE-6 which can be also coupled via the shifting clutch SE-B to the hollow shaft 41;

the loose gearwheel 39 of the gearwheel set RE-6 meshes with another fixed gearwheel 40 on the output shaft 24;

the hollow shaft 41 is further provided with a fixed gearwheel 43 of the gearwheel set RE-7, which is in engagement with a fixed gearwheel 42 on one hollow shaft 44 rotatably mounted on the output shaft 24;

the hollow shaft 41 on the input shaft 23 can be further connected with a switching clutch SE-A to the input shaft 23, wherein the switching clutch SE-A alternately couples also a loose gearwheel 45 of the gearwheel set RE-8 to the input shaft 23;

the fixed gearwheel 46 of the gearwheel set RE-8 is analogously to the fixed gearwheel 42 of the RE-7 arranged on the hollow shaft 44, wherein the hollow shaft 44 can be connected via a simple shifting clutch SE-E to the output shaft 24.

The switching clutches SE-C, SE-F, SE-D, SE-B and SE-A can be designed as known dual synchronizing clutches that are common with shifting clutches (with a position of their switching sleeves shown in FIG. 1 on the left (Ii) or on the right (re) and the switching clutch SE-E can be designed as a simple synchronizing clutch (switching position Ii), which is electrically controlled via a corresponding electrically/hydraulically operated actuators each time from a neutral position (as shown).

The clutches K1, K2 may be hydraulically load-shiftable lamellar clutches which alternately operate the sub-transmission A or B according to the corresponding preselection of the gears integrated in the driving force flow.

The forward gears 1 through 12, (a possibly required reverse gear is not shown to simplify the explanation), can be switched according to the switching matrix of FIG. 2, wherein the respective switched gears (G) 1 through 12 are listed in the left column. The x marks (X) denote the gear sets RE1 through RE8 which are integrated into the force flow and the designations (Ii) or (re) indicate the switching positions of the respective shifting clutches SE. It should be noted that the gears 1 and 3 are listed twice in the column G because they are switchable via the sub-transmission B (clutch K1) or via sub-transmission A (clutch K2).

The regular shifting sequence can be therefore 1-2-3-4 5 ff., wherein the 1st gear is activated via the clutch K1 (sub-transmission B) and the other gears are activated by alternately closing the clutches K2, K1, K2, etc. The next gear can be preselected in a known manner in the sub-transmission with the open clutch, whereby the switching of the clutches K1, K2 can be achieved without an interruption of the tractive force.

In the modified shifting sequence, the 2nd gear and when appropriate also the 4th gear can be skipped without interrupting the tractive force, wherein the force flow is controlled in the 1st gear via the clutch K1 or K2 (sub-transmission A or B) with a corresponding integration of the gearwheel sets RE-1 through R-8 and of the position of the shifting clutches SE (see the matrix). The result is that the 3rd gear and when appropriate the 5th gear are already preselected and can be activated by changing the load-shiftable clutch without interrupting the tractive force.

Therefore, in addition to the regular shifting sequence of the dual clutch transmission 20, it is possible to control in this manner the modified shifting sequences 1-3-4-5-6 ff. in the sequence K2, K1, K2, K1, K2, ff., or 1-3-5-6, ff., in the sequence K1, K2, K1, K2, ff., wherein the shifting sequences can be preset or manually adjusted depending on the operating data and driving parameters of the motor vehicle by means of electronic transmission control.

As can be seen further from the switching matrix of FIG. 2, the forward gears 3 through 8 as well as 11 and 12 are designed as direct gears, which are respectively provided with exactly one wheel plane connected in the torque flow. In contrast to that, the forward gears 1, 2 and 9 as well 10 are not realized as direct gears, but as twist gears in which by means of the switching elements SE-A through SE-G, exactly three respective wheel planes are combined in series and connected in the torque flow. As an example, the eighth, seventh and fifth wheel planes RE-8, RE-7 and RE-5 are connected in the 1st forward gear (twist gear) in the torque flow. In the 2nd forward gear (twist gear), the first, second and third wheel planes (twist gear) are connected the second and third wheel planes RE-1, RE-2, RE3 in the torque flow. In the 9th forward gear (twist gear), the eighth, seventh and sixth wheel planes RE-8, RE-7, RE-6 are connected in the torque flow. With the 10th forward gear (twist gear) engaged, the 1st, 2nd and 4th wheel planes RE-1, RE-2 and RE-4 are connected.

In order to provide the respective twist forward gears 1, 2 and 9 as well as 10, the three wheel planes to be connected are either completely assigned to the first sub-transmission A, or completely assigned to the second sub-transmission B. This means that with a connected twist forward gear, only the three twist shift wheel planes provided with the sub-transmission are integrated in the torque flow of the engaged gear, while the other sub-transmission are completely decoupled.

In order to form a reverse gear R, a reverse gear shaft 50 bridging over both sub-transmissions A, B is mounted in a transmission housing of the dual clutch housing, not shown, axially parallel to the input shafts 22, 23 and to the output shaft 24. The reverse gear shaft 50 supports two reversing gearwheels 51, 53, among which the first reversing gearwheel 51 meshes with the drive-side gearwheel 30 of the second wheel plane RE-2 and the second reversing gearwheel 53 meshes with the drive-side gearwheel 37 of the fifth wheel plane RE-5.

The first reversing wheel 51 which cooperates with the second wheel plane RE-2 of the sub-transmission A is designed as a loose gearwheel and can be coupled by means of a switching element SE-H, which is switchable on one side, to the reverse gear shaft 50. The reversing gearwheel 53, which cooperates with the fifth wheel plane RE-5, is on the other hand designed as a fixed gearwheel.

The reverse gear R is activated by switching the switching element SE-C of FIG. 1, which is supported by the first input shaft 22, to the left to the drive-side gearwheel 30 of the first wheel plane RE-1. In addition, the switching element SE-H is switched to the left to the first reversing wheel 51 and it couples the output-side gearwheel 38 of the intermediated wheel plane RE-5 via the switching element SE-G to the output drive 24. The reverse gear R is therefore a twist gear, wherein torque flow passes with a closed separating clutch K2 via the hollow input shaft 22 and the drive-side gearwheel 30 of the second wheel plane RE-2 to the first reversing gearwheel 51 and further via the reverse gear shaft 50 as well as the second reverse gearwheel 53 to the output-side gearwheel of the intermediate wheel plane RE-5

The invention claimed is:

1. A dual clutch transmission for a motor vehicle, comprising:
  switchable gearwheel sets, which form exactly eight wheel planes arranged in the axial direction from the input side to the output side of the dual clutch transmission arranged in the sequence from first to the eight wheel plane arranged one after another, which are assigned to a first and to a second sub-transmission, wherein the first sub-transmission is provided with a first input shaft and the second sub-transmission is provided with the second sub-transmission, and both sub-transmissions are provided with a common output shaft, wherein the input shafts can be alternately activated via a load-switchable clutch and wherein to the second sub-transmission are assigned the odd forward gears and to the first sub-transmission are assigned the even forward gears, which are switchable via corresponding switching elements, wherein the gearwheel sets of the first through fourth wheel plane form the first sub-transmission and the gearwheel sets of the fifth through eighth wheel plane form the second sub-transmission, and wherein the dual clutch transmission is a 12-gear transmission, in which only eight gear levels are used with multiple use of the gearwheel sets of the wheel planes, wherein one gearwheel set of the fifth wheel plane of the second sub-transmission can be coupled via one of the switching elements to the first sub-transmission, wherein an output-side gearwheel of the gearwheel set of the fifth wheel plane, which can be switched to both sub-transmissions, is arranged on a joint output shaft and a drive-side gearwheel of the gearwheel set, which can be switched to both sub-transmissions, can be coupled via the switching elements to the first sub-transmission or to the second sub-transmission, and wherein one switching element of the switching elements is switchable on both sides in the axial direction, by which a gearwheel of the fourth wheel plane of the first sub-transmission or the gearwheel of the fifth wheel plane, switchable to both sub-transmissions of the second sub-transmission can be switched, and wherein a commonly used gearwheel of the fifth wheel plane of the second sub-transmission is arranged immediately adjacent to the first sub-transmission.

2. The dual clutch transmission according to claim 1, wherein on the gearwheel of the fifth wheel plane, which is switchable to both sub-transmissions, is formed at least the third forward gear of the second sub-transmission, which can be drivingly connected, directly or indirectly, selectively to the first or to the second input shaft of the first or of the second sub-transmission.

3. The dual clutch transmission according to claim 2, wherein the gearwheel set of the fifth wheel plane, which is switchable to both sub-transmissions, is also integrated into the power flow of the first forward gear.

4. The dual clutch transmission according to claim 2, wherein the twelve forward gears can be switched by means of switchable switching elements that are switchable on both sides and one switching element switchable on one side, wherein four switching elements on both coaxially arranged input shafts of the sub-transmissions and at least one switching element switchable on one side are positioned on the common output shaft.

5. The dual clutch transmission according to claim 1, wherein the input shafts are free of gearwheels of the wheel planes arranged non-rotationally thereupon, and the first input shaft is provided with exactly one switching element switchable on both sides in axial direction and the second input shaft is provided with exactly one second switching element switchable in the axial direction on both sides, and by the first switching element, the first input shaft can be coupled to or decoupled from all of the wheel planes of the first sub-transmission, and by the second switching element, the second input shaft can be coupled to or decoupled from all of the wheel planes of the second sub-transmission.

6. The dual clutch transmission according to claim 5, wherein a drive-side loose gearwheel of the first wheel plane is mounted on the first input shaft of the first switching element on both sides in the axial direction, and a drive-side coaxially mounted hollow shaft of the first sub-transmission arranged on the first input shaft can be alternately coupled via the first switching element to the first input shaft, and that a drive-side hollow shaft of the first sub-transmission supports at least one fixed gearwheel of the second wheel plane and a fixed gearwheel of the third wheel plane.

7. The dual clutch transmission according to claim 6, wherein on the drive-side hollow shaft of the first sub-transmission is mounted a drive-side gearwheel of the fourth wheel plane, and the drive-side hollow shaft of the first sub-transmission is provided with a third switching element, by which a loosely mounted drive-side gearwheel of the fourth wheel plane can be coupled to the drive-side hollow shaft of the first sub-transmission.

8. The dual clutch transmission according to claim 7, wherein the second sub-transmission, is provided with a fifth wheel plane which is immediately adjacent in the axial direction to the first sub-transmission, and that the fifth wheel plane can be coupled by means of the third switching element to the first sub-transmission.

9. The dual clutch transmission according to claim 8, wherein the fifth wheel plane, which can be switched to both sub-transmissions, is loosely mounted with its drive-side gearwheel on the second input shaft, and that the drive-side gearwheel of the fifth wheel plane, which can be switched to both sub-transmissions, can be coupled by means of the third switching element to the drive-side hollow shaft of the first sub-transmission.

10. The dual clutch transmission according to claim 9, wherein a drive-side loose gearwheel of the eighth wheel plane, arranged in the axial direction on both sides of the second switching element of the second sub-transmission, is mounted in the second input shaft, and a drive-side hollow shaft of the second sub-transmission is coaxially mounted on the second input shaft, and the drive-side loose gearwheel of the eighth wheel plane and the drive-side hollow shaft of the second sub-transmission can be alternately coupled via the second switching element to the second input shaft, and that the drive-side hollow shaft of the second sub-transmission supports at least one fixed wheel of a seventh wheel plane.

11. The dual clutch transmission according to claim 10, wherein a drive-side gearwheel of the sixth wheel plane is mounted on the drive-side hollow shaft of the second sub-transmission, and the drive-side hollow shaft of the second sub-transmission is provided with a fourth switching element, by which a mounted drive-side gearwheel of the sixth wheel plane can be coupled to the drive-side hollow shaft of the second sub-transmission.

12. The dual clutch transmission according to claim 11, wherein the drive-side gearwheel of the fifth wheel plane which can be switched so both sub-transmissions can be coupled by the fourth switching element to the drive-side hollow shaft of the second sub-transmission.

13. The dual clutch transmission according to claim 12, wherein the output shaft is arranged axially parallel to the first and to the second input shaft, and output-side gearwheels of the first and of the second wheel plane of the first sub-transmission are non-rotationally arranged on a drive-side hollow shaft of the first sub-transmission, which is coaxially and rotationally mounted on the output shaft.

14. The dual clutch transmission according to claim 13, wherein the output shaft is provided with a fifth switching element, by which the drive-side hollow shaft of the first sub-transmission, or the gearwheel of the third wheel plane, which is mounted on the output shaft, can be alternately coupled to the output shaft.

15. The dual clutch transmission according to claim 14, wherein output-side gearwheels of the seventh and eighth wheel planes of the second sub-transmission are non-rotatably arranged on an output-side hollow shaft of the second sub-transmission, which is coaxially and rotatably mounted on the output shaft.

16. The dual clutch transmission according to claim 15, wherein the output shaft is provided with a sixth switching element by which the output-side hollow shaft of the second sub-transmission can be coupled to the output shaft.

17. The dual clutch transmission according to claim 9, wherein the output-side gearwheel, which is arranged as a fixed gearwheel on the output shaft of the fifth wheel plane which can be switched to both sub-transmissions, or that the output-side gearwheel of the fifth wheel plane is loosely mounted on the output shaft and that it can be coupled via a seventh switching element to the output shaft.

\* \* \* \* \*